(12) United States Patent
Breit et al.

(10) Patent No.: US 10,218,010 B2
(45) Date of Patent: Feb. 26, 2019

(54) UTILIZING PHASE CHANGE MATERIAL, HEAT PIPES, AND FUEL CELLS FOR AIRCRAFT APPLICATIONS

(71) Applicants: The Boeing Company, Chicago, IL (US); University of Connecticut, Farmington, CT (US)

(72) Inventors: Joseph Sherman Breit, Bellevue, WA (US); Casey Joe Roberts, Kirkland, WA (US); Amir Faghri, Mansfield, CT (US); Travis Robert Ward, Manchester, CT (US); Christopher Robak, Brookfield, CT (US)

(73) Assignees: The Boeing Company, Chicago, IL (US); University of Connecticut, Farmington, CT (US)

(*) Notice: Subject to any disclaimer, the term of this patent is extended or adjusted under 35 U.S.C. 154(b) by 0 days.

(21) Appl. No.: 15/261,395

(22) Filed: Sep. 9, 2016

(65) Prior Publication Data
US 2016/0380279 A1    Dec. 29, 2016

Related U.S. Application Data

(62) Division of application No. 13/357,254, filed on Jan. 24, 2012, now Pat. No. 9,548,504.

(51) Int. Cl.
*B64C 1/40* (2006.01)
*B64D 11/04* (2006.01)
(Continued)

(52) U.S. Cl.
CPC ........... *H01M 8/04052* (2013.01); *B64C 1/40* (2013.01); *B64D 11/04* (2013.01);
(Continued)

(58) Field of Classification Search
CPC ......... H01M 8/04052; H01M 8/04059; H01M 8/04067; H01M 8/04164; H01M 2250/20;
(Continued)

(56) References Cited

U.S. PATENT DOCUMENTS 4,377,198 A * 3/1983 Welling ................. F28D 15/04
165/104.11
4,382,466 A * 5/1983 Shiraishi .................... F24J 2/32
165/104.11
(Continued)

FOREIGN PATENT DOCUMENTS

DE    102008019099 A1    6/2009
DE    102008024826 A1    11/2009
(Continued)

OTHER PUBLICATIONS

EP Search Report for related Application No. 12187733.6 dated Feb. 13, 2014, 4 pages.
(Continued)

*Primary Examiner* — Gregg Cantelmo
(74) *Attorney, Agent, or Firm* — Armstrong Teasdale LLP

(57) ABSTRACT

A heat transfer system includes a fuel cell module that produces heat and water, and a thermal energy storage module that stores the heat produced by the fuel cell module. The thermal energy storage module includes a phase-change material. A conduit couples the fuel cell module to the thermal energy storage module. The conduit is oriented to channel the water produced by the fuel cell module through the thermal energy storage module.

10 Claims, 13 Drawing Sheets

(51) Int. Cl.
  *B64D 41/00* (2006.01)
  *H01M 8/04007* (2016.01)
  *H01M 8/04119* (2016.01)

(52) U.S. Cl.
  CPC ... *H01M 8/04059* (2013.01); *H01M 8/04067* (2013.01); *H01M 8/04164* (2013.01); *B64D 2041/005* (2013.01); *H01M 2250/20* (2013.01); *Y02E 60/50* (2013.01); *Y02T 90/32* (2013.01)

(58) Field of Classification Search
  CPC ..... B64C 1/40; B64D 11/04; B64D 2041/005; Y02E 60/50; Y02T 90/32
  See application file for complete search history.

(56) References Cited

U.S. PATENT DOCUMENTS

| | | | |
|---|---|---|---|
| 4,628,010 A * | 12/1986 | Iwanciow | H01M 8/0606 429/421 |
| 5,268,240 A | 12/1993 | Miyama | |
| 6,296,957 B1 | 10/2001 | Graage | |
| 6,400,896 B1 * | 6/2002 | Longardner | F28D 20/02 126/400 |
| 6,835,483 B2 | 12/2004 | Ballantine et al. | |
| 6,899,967 B2 | 5/2005 | Johnson | |
| 7,285,753 B2 | 10/2007 | Hoehne et al. | |
| 7,505,269 B1 | 3/2009 | Cosley et al. | |
| 7,550,218 B2 | 6/2009 | Hoffjann et al. | |
| 7,987,898 B2 | 8/2011 | Meng et al. | |
| 2003/0066239 A1 | 4/2003 | Parchamazad | |
| 2003/0155160 A1 | 8/2003 | Nomura et al. | |
| 2005/0089735 A1 | 4/2005 | Jorgensen et al. | |
| 2005/0207120 A1 | 9/2005 | Tseng et al. | |
| 2005/0266287 A1 | 12/2005 | Hoffjann et al. | |
| 2006/0147773 A1 | 7/2006 | Steinshnider et al. | |
| 2006/0269807 A1 | 11/2006 | Fujita et al. | |
| 2007/0012429 A1 | 1/2007 | Siu | |
| 2007/0062116 A1 | 3/2007 | Edlund et al. | |
| 2007/0141420 A1 | 6/2007 | Voss et al. | |
| 2007/0175609 A1 | 8/2007 | Christ et al. | |
| 2010/0059346 A1 | 3/2010 | Shim et al. | |
| 2010/0221627 A1 | 9/2010 | Nakakubo | |
| 2011/0121703 A1 | 5/2011 | Karlicek, Jr. et al. | |
| 2011/0284189 A1 | 11/2011 | Sinha et al. | |
| 2013/0260273 A1 * | 10/2013 | Scheibert | H01M 8/04059 429/437 |

FOREIGN PATENT DOCUMENTS

| | | | | |
|---|---|---|---|---|
| EP | 1798488 A2 | | 6/2007 | |
| JP | 58023169 A | | 2/1983 | |
| JP | 60124366 A | | 7/1985 | |
| JP | 61036695 A | * | 2/1986 | ......... F28D 15/0233 |
| JP | 62131474 A | | 6/1987 | |
| JP | 06074673 A | * | 3/1994 | ......... F28D 15/0275 |
| JP | 2001280134 A | * | 10/2001 | |
| JP | 2002151129 A | * | 5/2002 | |
| JP | 2003317787 A | | 11/2003 | |
| JP | 2004127625 A | | 4/2004 | |
| JP | 2005078970 A | | 3/2005 | |
| JP | 2006127968 A | | 5/2006 | |
| JP | 2006185657 A | | 7/2006 | |
| JP | 2008004516 A | | 1/2008 | |
| JP | 2011228079 A | | 11/2011 | |
| WO | 2006069173 A2 | | 6/2006 | |

OTHER PUBLICATIONS

European Search Report for Application No. 13154376.1; dated Jun. 18, 2003; 6 pages.
European Search Report for Application No. 12187733.6; dated May 16, 2013; 5 pages.
EPO Examination Report for related application 13154376.1 dated Aug. 26, 2016; 6 pp.
JP Search Report for related Application No. 2013010197 dated Nov. 1, 2016; 4 pages.

* cited by examiner

UTILIZING PHASE CHANGE MATERIAL, HEAT PIPES, AND FUEL CELLS FOR AIRCRAFT APPLICATIONS

CROSS-REFERENCE TO RELATED APPLICATIONS

This application is a divisional and claims priority to U.S. patent application Ser. No. 13/357,254 filed Jan. 24, 2012 for "UTILIZING PHASE CHANGE MATERIAL, HEAT PIPES, AND FUEL CELLS FOR AIRCRAFT APPLICATIONS", and issued as U.S. Pat. No. 9,548,504, which is hereby incorporated by reference in its entirety.

BACKGROUND

The present disclosure relates generally to heat transfer systems and, more particularly, to methods and systems for utilizing thermal energy in the form of heat produced by a fuel cell module and/or utilizing heat stored in a phase change material thermal energy storage module.

Known aircraft include a plurality of engines that generate lifting power. At least some known aircraft include electrical components that require electricity to operate. To provide electricity to such electrical components, at least some known aircraft extract power from the engines. However, supplying electricity from the engines to the electrical components increases an overall fuel consumption of the engine. To facilitate reducing electrical demand from the engines, at least some known aircraft include fuel cells that generate power for use in powering onboard electrical components. However, at least some known aircraft do not efficiently utilize electricity and/or byproducts generated by the fuel cell.

BRIEF SUMMARY

In at least one other aspect, a method for operating a heat transfer system is provided. The method includes coupling a plurality of heat pipes to the load. Heat is transferred to a thermal energy storage module including a phase-change material. The heat is stored in the thermal energy storage module. The thermal energy storage module is coupled to the plurality of heat pipes to facilitate transferring heat towards the load.

In at least one other aspect, a heat transfer system is provided. The heat transfer system includes a load, and a plurality of heat pipes coupled to the load. A thermal energy storage module is coupled to the plurality of heat pipes to facilitate transferring heat towards the load. The thermal energy storage module includes a phase-change material.

In at least one other aspect, a method for operating a heat transfer system is provided. The method includes transferring heat to a thermal energy storage module including a phase-change material. The heat is stored in the thermal energy storage module. The thermal energy storage module is circumscribed about the load to facilitate transferring heat towards the load.

In at least one other aspect, a heat transfer system is provided. The heat transfer system includes a load, and a thermal energy storage module circumscribing the load to facilitate transferring heat towards the load. The thermal energy storage module includes a phase-change material.

In at least one other aspect, an aircraft is provided. The aircraft includes a galley including at least one load positioned therein, a fuel cell module configured to produce heat and water, and a heat transfer system. The heat transfer system includes a first plurality of heat pipes coupled to the at least one load and a thermal energy storage module coupled to the first plurality of heat pipes to facilitate transferring the heat produced by the fuel cell module towards the at least one load. The thermal energy storage module includes a phase-change material.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION

The subject matter described herein relates generally to heat transfer systems and, more particularly, to methods and systems for utilizing heat produced by a fuel cell module and/or for utilizing heat stored in a thermal energy storage module. In one embodiment, a fuel cell module produces electricity, heat, and water. A thermal energy storage module including a phase-change material stores the heat produced by the fuel cell module. A conduit coupling the fuel cell module to the thermal energy storage module channels water through the thermal energy storage module. As such, the thermal energy storage module is positioned to facilitate cooling the fuel cell module, and the water is used to facilitate cooling the thermal energy storage module.

As used herein, the term "load" or "external load" refers to any device and/or machine that utilizes electricity, heat, water, and/or any other byproduct generated, created, and/or produced by another device and/or machine. An element or step recited in the singular and proceeded with the word "a" or "an" should be understood as not excluding plural elements or steps unless such exclusion is explicitly recited. Moreover, references to "one embodiment" of the present invention and/or the "exemplary embodiment" are not intended to be interpreted as excluding the existence of additional embodiments that also incorporate the recited features.

Figure 1:
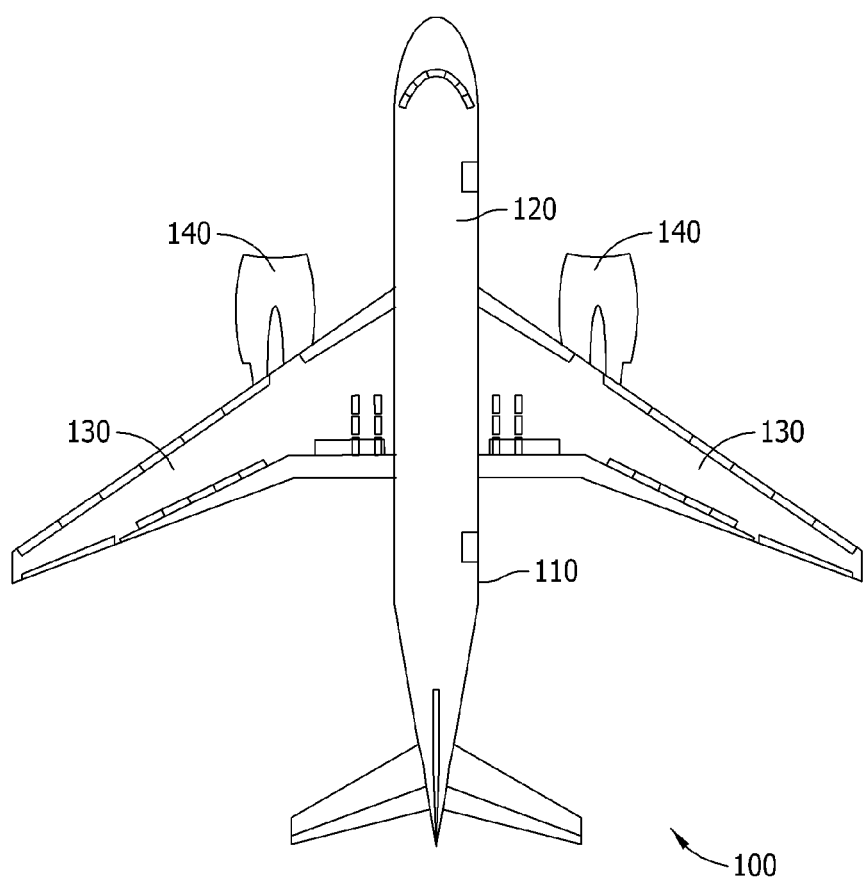
FIG. 1 is a plan view of an exemplary aircraft.

FIG. 1 is a plan view of an exemplary aircraft 100. In the exemplary embodiment, aircraft 100 includes a body 110 that includes a fuselage 120 and a pair of wings 130 extending from fuselage 120. In the exemplary embodiment, at least one engine 140 is coupled to each wing 130 to provide thrust for aircraft 100. Aircraft 100 may include any number of engines 140 that enables aircraft 100 to function as described herein. In the exemplary embodiment, aircraft 100 includes at least one component and/or structure that is fabricated from a composite material.

Figure 2:
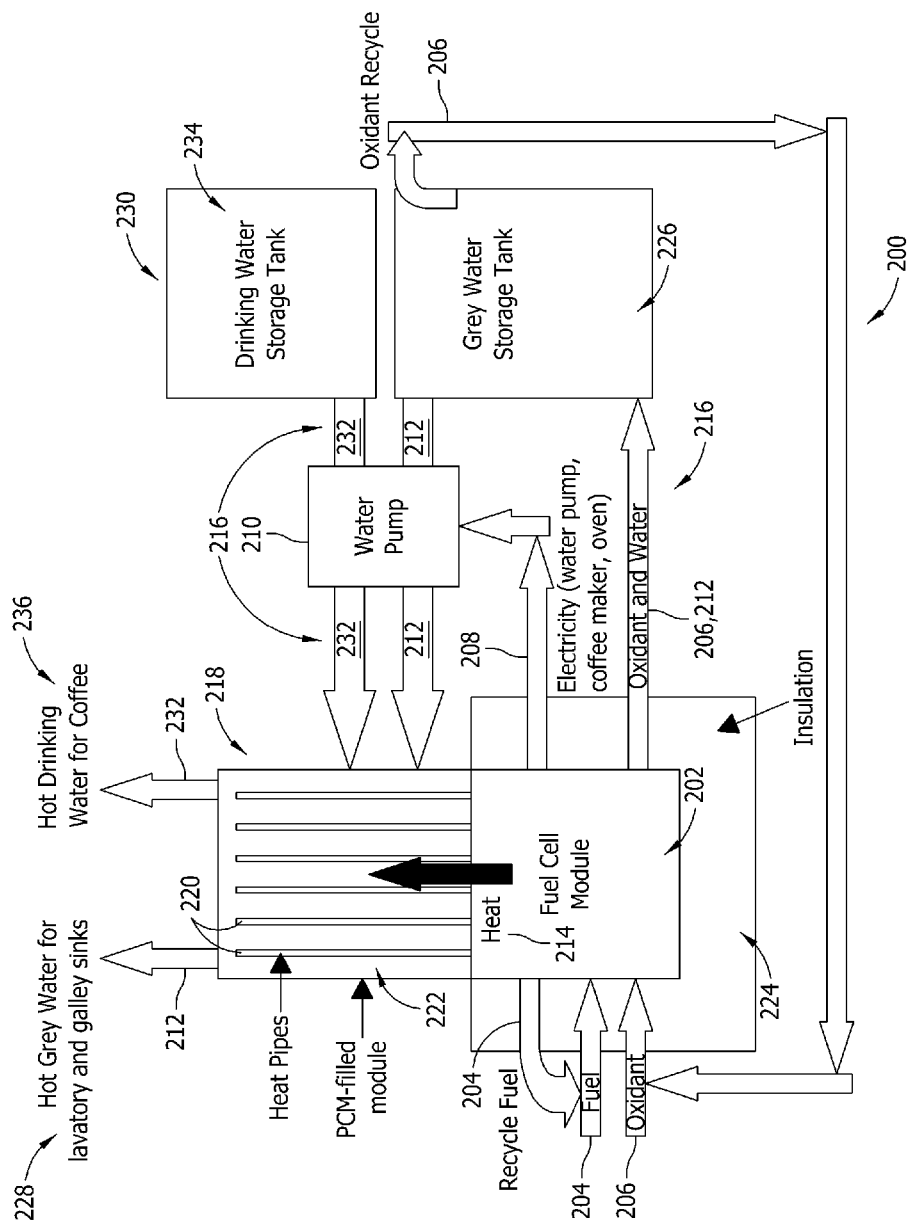
FIGS. 2-7 are schematic illustrations of exemplary heat transfer systems that utilize heat produced by a fuel cell module.

FIG. 2 is a schematic illustration of an exemplary heat transfer system 200 that may be used to utilize heat produced by a fuel cell module 202 on and/or within aircraft 100

(shown in FIG. 1). In the exemplary embodiment, fuel cell module 202 is a device that converts fuel 204 and oxidants 206 into electricity 208 that may be used within aircraft 100. In the exemplary embodiment, electricity 208 is used to run, for example, a water pump 210 (i.e., an external load). Other external loads that may run on electricity 208 include, without limitation, a coffee machine and/or an oven. In the exemplary embodiment, fuel cell module 202 produces water 212 and thermal energy or heat 214.

In the exemplary embodiment, at least one conduit 216 couples fuel cell module 202 in flow communication with a thermal energy storage module 218. In the exemplary embodiment, thermal energy storage module 218 includes a plurality of heat pipes 220 and a phase-change material (PCM) 222. Moreover, in the exemplary embodiment, heat pipes 220 are coupled to fuel cell module 202 to facilitate passively transferring heat 214 between fuel cell module 202 and PCM 222. Furthermore, in the exemplary embodiment, at least one insulating layer 224 substantially circumscribes fuel cell module 202 and/or thermal energy storage module 218 to facilitate decreasing heat loss to the ambient environment.

In the exemplary embodiment, heat pipes 220 reduce the thermal resistance within PCM 222 to facilitate increasing the heat transfer rate and/or the efficiency between fuel cell module 202 and thermal energy storage module 218. For example, in at least some embodiments, heat pipes 220 are fabricated from, for example, copper, aluminum, and/or steel and include working fluids operating between approximately 0° C. and approximately 200° C. More particularly, in at least some embodiments, the working fluids operate between approximately 25° C. and approximately 200° C. Even more particularly, in at least some embodiments, the working fluids operate between approximately 25° C. and approximately 160° C. Working fluids for use in heat pipes 220 may include, without limitation, water and/or methanol. Moreover, in at least some embodiments, heat pipes 220 include a wick structure that is fabricated from, for example, sintered metal powder, metal fibers, and/or screen mesh. Alternatively, heat pipes 220 may be fabricated from any other material and/or include any other fluid that enable heat transfer system 200 to function as described herein. For example, in at least one embodiment, heat pipes 220 are in a vertical orientation and are gravity assisted.

Generally, heat 214 is transferred from fuel cell module 202 towards PCM 222, which melts as it absorbs heat 214. In the exemplary embodiment, PCM 222 has a melting point between approximately 10° C. and approximately 100° C., depending on the fuel cell operating temperature range. For example, in at least some embodiments, fuel cell module 202 operates at a temperature between approximately 50° C. and approximately 160° C. More particularly, in at least some embodiments, fuel cell module 202 operates at a temperature between approximately 100° C. and approximately 160° C. In at least some embodiments, PCM 222 is fabricated from an organic material, such as paraffin wax, fatty acid, and/or sugar alcohol, and/or from an inorganic material, such as molten salt, salt hydrate, and/or another salt mixture. Alternatively, PCM 222 may be fabricated from any other material that enable heat transfer system 200 to function as described herein.

In the exemplary embodiment, heat transfer system 200 regulates and/or manages a temperature of water 212 and/or thermal energy storage module 218. In the exemplary embodiment, heat transfer system 200 includes a first storage tank 226 positioned to store water 212. More specifically, in the exemplary embodiment, storage tank 226 is coupled in flow communication between fuel cell module 202 and thermal energy storage module 218 such that water 212 discharged from fuel cell module 202 is channeled into storage tank 226 and subsequently channeled towards thermal energy storage module 218. In the exemplary embodiment, conduit 216 is positioned and/or oriented to channel water 212 through thermal energy storage module 218 towards, for example, a sink 228 (i.e., an external load). In the exemplary embodiment, thermal energy storage module 218 is removably coupled to sink 228.

In the exemplary embodiment, heat transfer system 200 includes a second water system 230 including potable water 232 that is not generally mixed with water 212. In the exemplary embodiment, heat transfer system 200 regulates and/or controls a temperature of potable water 232 and/or thermal energy storage module 218. In the exemplary embodiment, heat transfer system 200 includes a second storage tank 234 positioned to store potable water 232. In the exemplary embodiment, potable water 232 is channeled from second storage tank 234 through thermal energy storage module 218 and towards, for example, coffee machine 236 (i.e., an external load).

During operation, fuel cell module 202 receives fuel 204 and oxidants 206 and generates and/or produces electricity 208, water 212, and/or heat 214. In the exemplary embodiment, at least some fuel 204 may be discharged from fuel cell module 202 for reuse in fuel cell module 202. In the exemplary embodiment, heat pipes 220 absorb heat 214 from fuel cell module 202, and PCM 222 stores heat 214.

In the exemplary embodiment, water 212 and oxidants 206 are discharged from fuel cell module 202 towards storage tank 226, wherein oxidants 206 are separated from water 212. In the exemplary embodiment, at least some oxidants 206 may be discharged from storage tank 226 for reuse in fuel cell module 202. In the exemplary embodiment, water pump 210 draws water 212 and/or 232 from a respective storage tank 226 and/or 234 and discharges water 212 and/or 232 towards thermal energy storage module 218. In at least one embodiment, water 212 is mixed with other water within storage tank 226 to facilitate reducing a temperature of water 212.

In the exemplary embodiment, as water 212 and/or 232 is channeled through thermal energy storage module 218, heat 214 is transferred from thermal energy storage module 218 to water 212 and/or 232 such that a temperature of thermal energy storage module 218 is facilitated to be decreased and a temperature of water 212 and/or 232 is facilitated to be increased. That is, in the exemplary embodiment, water 212 and/or 232 cools thermal energy storage module 218 to enable thermal energy storage module 218 to absorb heat 214 from fuel cell module 202, and thermal energy storage module 218 heats water 212 and/or 232 for use in, for example, sink 228 and/or coffee machine 236 (i.e., external loads).

Figure 3:
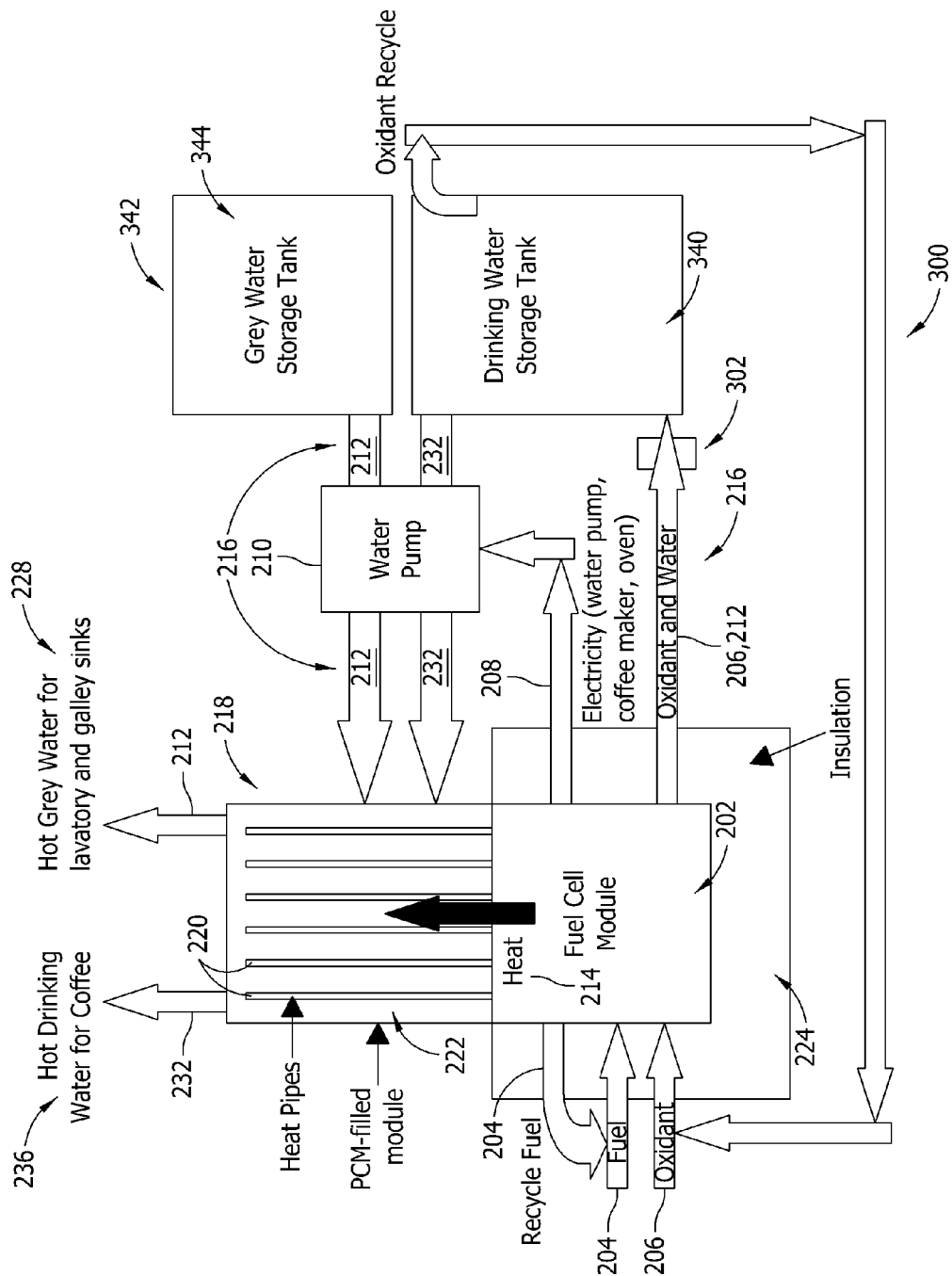

FIG. 3 is a schematic illustration of another exemplary heat transfer system 300 that may be used to utilize heat produced by fuel cell module 202 on and/or within aircraft 100 (shown in FIG. 1). In the exemplary embodiment, heat transfer system 300 is generally similar to heat transfer system 200, but includes a filter 338 configured to convert water 212 discharged by fuel cell module 202 into potable water 232. That is, in the exemplary embodiment, filter 302 is configured to facilitate increasing a drinking quality of the water channeled therethrough.

In the exemplary embodiment, filter 302 is positioned serially between fuel cell module 202 and a first storage tank 340. In the exemplary embodiment, storage tank 340 is positioned such that potable water 232 is channeled towards storage tank 340 and subsequently channeled towards thermal energy storage module 218. In the exemplary embodiment, heat transfer system 300 includes a second water system 342 including a second storage tank 344 and water 212 that is not generally mixed with water 232.

During operation, fuel cell module 202 receives fuel 204 and oxidants 206 and generates and/or produces electricity 208, water 212, and/or heat 214. In the exemplary embodiment, at least some fuel 204 may be discharged from fuel cell module 202 for reuse in fuel cell module 202. In the exemplary embodiment, heat pipes 220 absorb heat 214 from fuel cell module 202, and PCM 222 stores heat 214.

In the exemplary embodiment, water 212 and oxidants 206 are discharged from fuel cell module 202 towards filter 302. In the exemplary embodiment, filter 302 converts water 212 into potable water 232, and potable water 232 is discharged towards storage tank 340, wherein oxidants 206 are separated from potable water 232. In the exemplary embodiment, at least some oxidants 206 may be discharged from storage tank 340 for reuse in fuel cell module 202. In at least one embodiment, potable water 232 is mixed with other water within storage tank 340 to facilitate reducing a temperature of water 232. In the exemplary embodiment, water pump 210 draws water 212 and/or 232 from storage tank 344 and/or 340, respectively, and discharges water 212 and/or 232 towards thermal energy storage module 218.

In the exemplary embodiment, heat 214 is transferred from thermal energy storage module 218 to water 212 and/or 232 as water 212 and/or 232 is channeled through thermal energy storage module 218 such that a temperature of thermal energy storage module 218 is facilitated to be decreased and a temperature of water 212 and/or 232 is facilitated to be increased. That is, in the exemplary embodiment, water 212 and/or 232 cools thermal energy storage module 218 to enable thermal energy storage module 218 to absorb heat 214 from fuel cell module 202, and thermal energy storage module 218 heats water 212 and/or 232 for use in, for example, sink 228 and/or coffee machine 236 (i.e., external loads).

Figure 4:
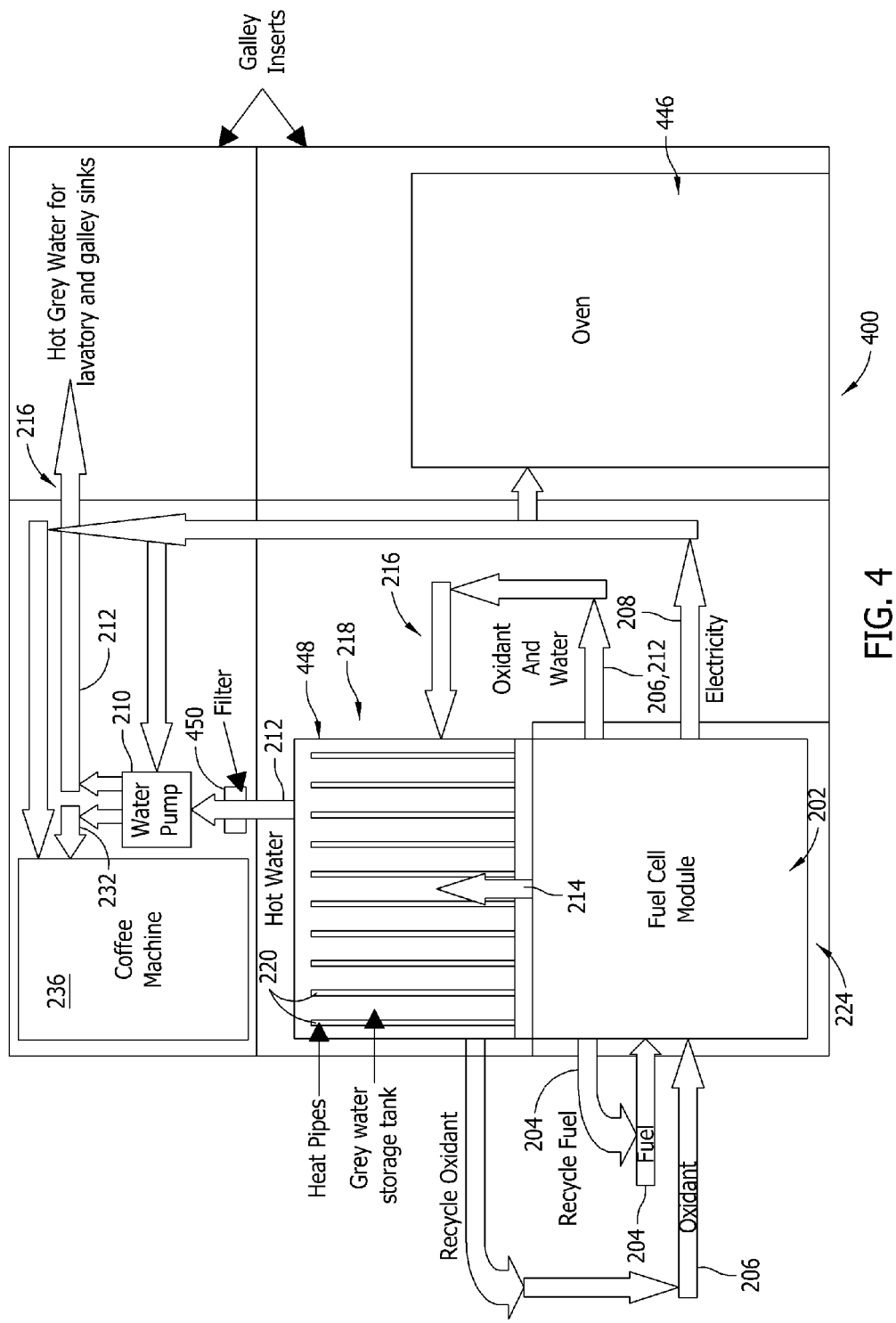

FIG. 4 is a schematic illustration of another exemplary heat transfer system 400 that may be used to utilize heat produced by a fuel cell module 202 on and/or within aircraft 100 (shown in FIG. 1). In the exemplary embodiment, electricity 208 is used to run, for example, water pump 210, coffee machine 236, and/or oven 446.

In the exemplary embodiment, heat transfer system 200 includes a storage tank 448 positioned to store water 212. More specifically, in the exemplary embodiment, storage tank 448 is positioned adjacent thermal energy storage module 218 such that water 212 discharged from fuel cell module 202 is channeled towards storage tank 448, wherein water 212 is heated by thermal energy storage module 218. In the exemplary embodiment, a filter 450 is positioned downstream from storage tank 448 and is configured to convert water 212 discharged from storage tank 448 into potable water 232. That is, in the exemplary embodiment, filter 450 is configured to facilitate increasing a drinking quality of the water channeled therethrough. In the exemplary embodiment, filter 450 is positioned serially between storage tank 448 and, for example, sink 228 and/or coffee machine 236 (i.e., external loads).

During operation, fuel cell module 202 receives fuel 204 and oxidants 206 and generates and/or produces electricity 208, water 212, and/or heat 214. In the exemplary embodiment, at least some fuel 204 may be discharged from fuel cell module 202 for reuse in fuel cell module 202. In the exemplary embodiment, heat pipes 220 absorb heat 214 from fuel cell module 202, and PCM 222 stores heat 214.

In the exemplary embodiment, water 212 and oxidants 206 are discharged from fuel cell module 202 towards storage tank 448, wherein oxidants 206 are separated from water 212. In the exemplary embodiment, at least some oxidants 206 may be discharged from storage tank 448 for reuse in fuel cell module 202. In at least one embodiment, tank 448 includes cold water and absorbs heat from fuel cell module 202 during operation. In such an embodiment, water 212 is mixed with the cold water within tank 448 to facilitate reducing a temperature of water 212. In the exemplary embodiment, heat 214 is transferred from thermal energy storage module 218 to water 212 as water 212 is stored within storage tank 448 such that a temperature of thermal energy storage module 218 is facilitated to be decreased and a temperature of water 212 is facilitated to be increased. That is, in the exemplary embodiment, water 212 cools thermal energy storage module 218 to enable thermal energy storage module 218 to absorb heat 214 from fuel cell module 202, and thermal energy storage module 218 heats water 212 for use in, for example, sink 228 and/or coffee machine 236 (i.e., external loads).

In the exemplary embodiment, water pump 210 draws water 212 from storage tank 448 and discharges water 212 towards filter 450. In the exemplary embodiment, filter 450 converts water 212 into potable water 232, and potable water 232 is discharged towards, for example, sink 228 and/or coffee machine 236 (i.e., external loads).

Figure 5:
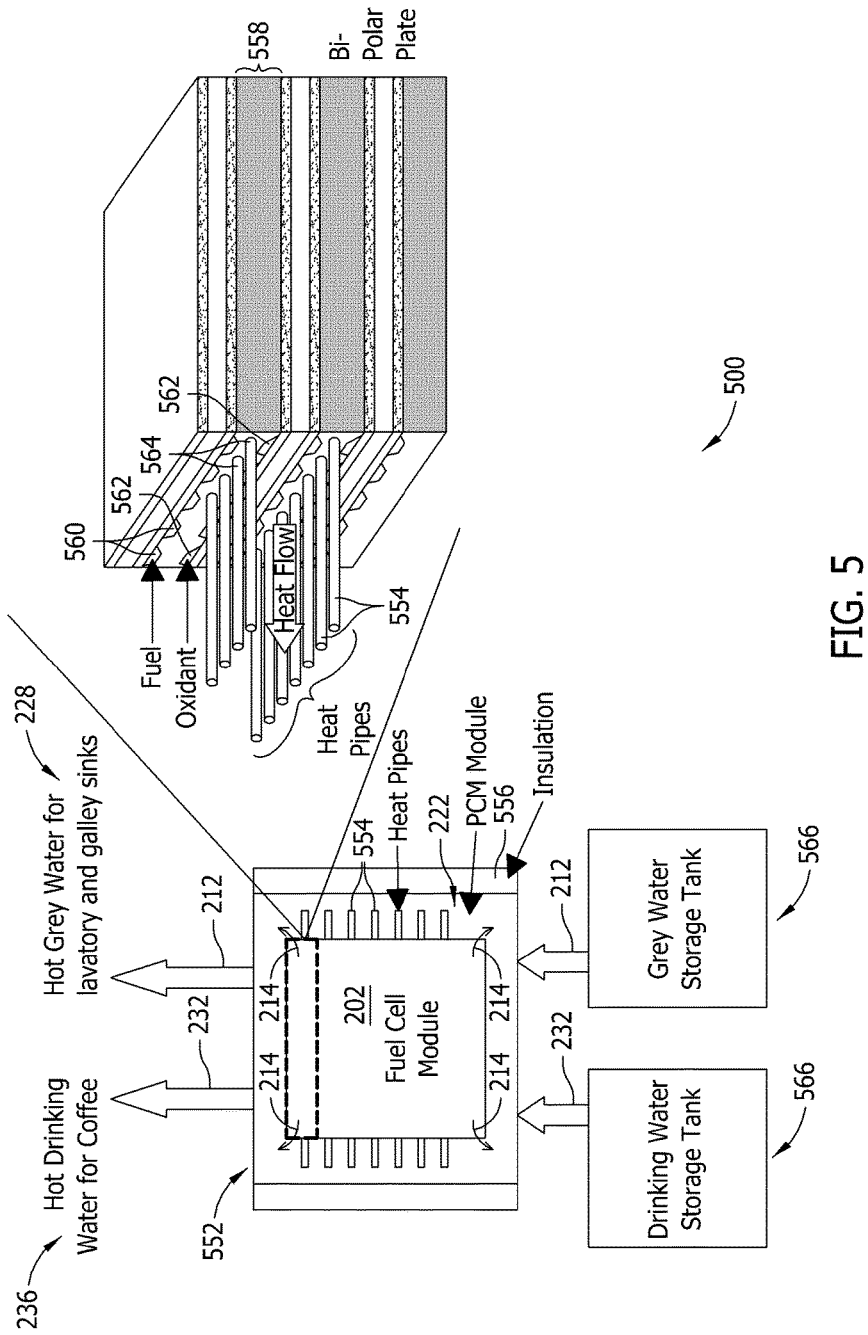

FIG. 5 is a schematic illustration of another exemplary heat transfer system 500 that may be used to utilize heat produced by a fuel cell module 202 on and/or within aircraft 100 (shown in FIG. 1). In the exemplary embodiment, fuel cell module 202 is integrally coupled to a thermal energy storage module 552 that includes a plurality of heat pipes 554 and PCM 222. In the exemplary embodiment, thermal energy storage module 552 substantially circumscribes fuel cell module 202 to facilitate decreasing heat loss to the ambient environment. Moreover, in the exemplary embodiment, at least one insulating layer 556 substantially circumscribes fuel cell module 202 and/or thermal energy storage module 552 to facilitate decreasing heat loss to the ambient environment. In the exemplary embodiment, heat pipes 554 are generally similar to heat pipes 220. Alternatively, heat pipes 554 may be fabricated from any other material and/or include any other fluid that enable heat transfer system 500 to function as described herein.

In the exemplary embodiment, heat pipes 552 are coupled to fuel cell module 202 to facilitate passively transferring heat 214 between fuel cell module 202 and PCM 222. More specifically, in the exemplary embodiment, fuel cell module 202 includes a plurality of bipolar plates 558 positioned in series circuit and/or in parallel circuit. In the exemplary embodiment, each plate 558 has a first plurality of channels 560 configured to channel fuel, a second plurality of channels 562 configured to channel oxidants, and a third plurality of channels 564 sized to receive heat pipes 554 such that heat pipes 554 are integrated therein. In the exemplary embodiment, channels 560, 562, and 564 extend longitudinally along plate 558.

In the exemplary embodiment, heat transfer system 500 includes at least one storage tank 566 positioned to store water 212 and/or 232. More specifically, in the exemplary embodiment, storage tank 566 is positioned adjacent thermal energy storage module 552 such that water 212 and/or 232 is channeled across fuel cell module 202 and/or thermal energy storage module 552 towards, for example, sink 228 and/or coffee machine 236 (i.e., external loads). In the exemplary embodiment, thermal energy storage module 552 is removably coupled to sink 228 and/or coffee machine 236.

During operation, fuel cell module 202 receives fuel 204 and oxidants 206, which are channeled through channels 560 and 562, respectively. In the exemplary embodiment, heat pipes 554 absorb heat 214 from fuel cell module 202, and PCM 222 stores heat 214.

In the exemplary embodiment, water 212 and/or 232 is channeled across thermal energy storage module 552 such that heat 214 is transferred from thermal energy storage module 552 to water 212 and/or 232 such that a temperature of thermal energy storage module 552 is facilitated to be decreased and a temperature of water 212 and/or 232 is facilitated to be increased. That is, in the exemplary embodiment, water 212 and/or 232 cools thermal energy storage module 552 to enable thermal energy storage module 552 to absorb heat 214 from fuel cell module 202, and thermal energy storage module 552 heats water 212 and/or 232 for use in, for example, sink 228 and/or coffee machine 236 (i.e., external loads). Additionally or alternatively, warm water 212 and/or 232 may be channeled in a reverse direction such that heat 214 is transferred from warm water 212 and/or 232 to thermal energy storage module 218 to facilitate regulating a temperature of thermal energy storage module 552 and/or warm water 212 and/or 232 and/or regulating an operating temperature of fuel cell module 202.

Figure 6:
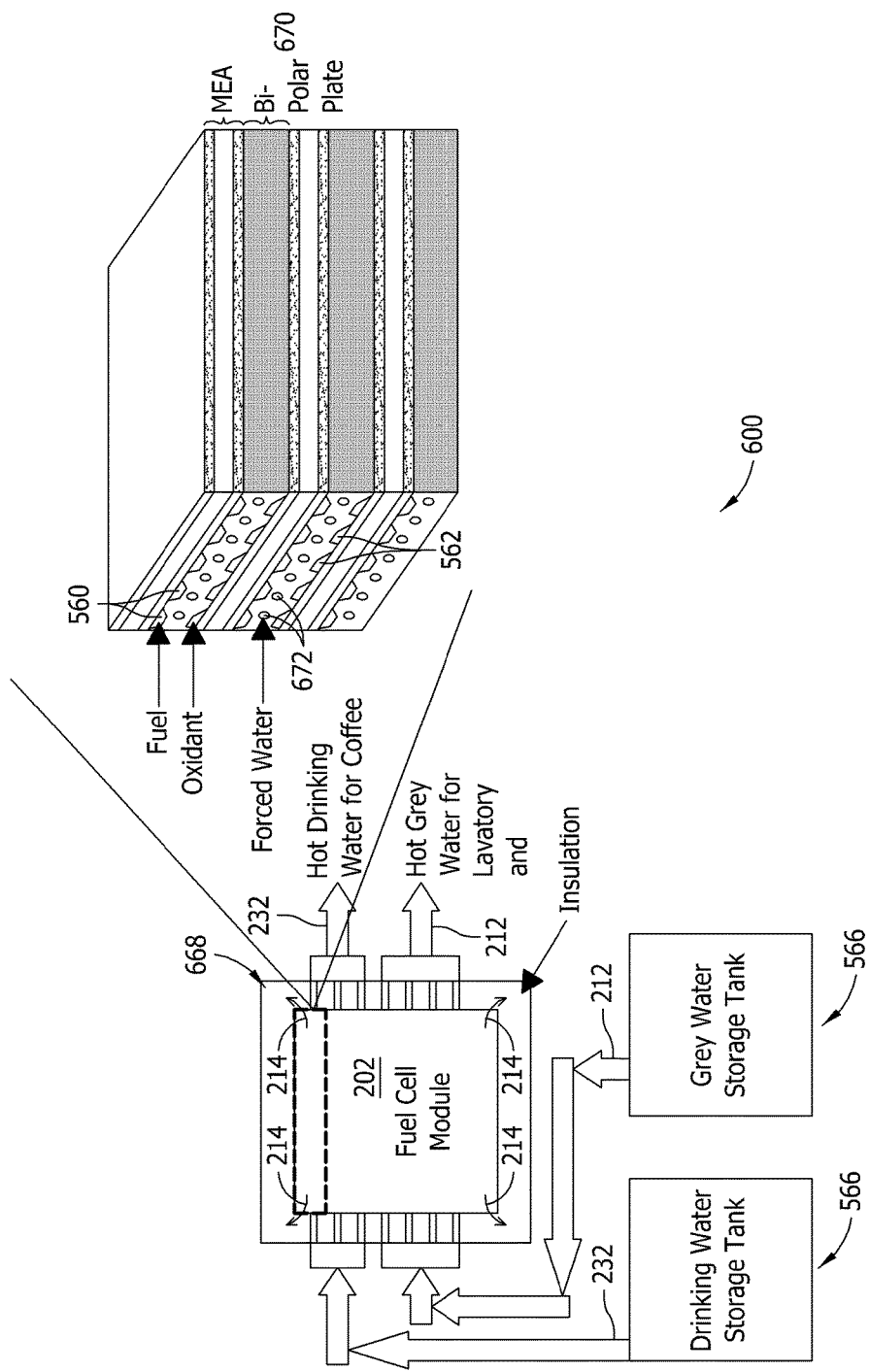

FIG. 6 is a schematic illustration of another exemplary heat transfer system 600 that may be used to utilize heat produced by a fuel cell module 202 on and/or within aircraft 100 (shown in FIG. 1). In the exemplary embodiment, fuel cell module 202 is integrally coupled to a thermal energy storage module 668 such that thermal energy storage module 668 substantially circumscribes fuel cell module 202 to facilitate decreasing heat loss to the ambient environment. Moreover, in the exemplary embodiment, insulating layer 556 substantially circumscribes fuel cell module 202 and/or thermal energy storage module 668 to facilitate decreasing heat loss to the ambient environment.

In the exemplary embodiment, fuel cell module 202 includes a plurality of bipolar plates 670 positioned in series circuit and/or in parallel circuit. In the exemplary embodiment, each plate 670 has first plurality of channels 560, second plurality of channels 562, and a third plurality of channels 672 configured to channel water 212 and/or 232. More specifically, in the exemplary embodiment, heat transfer system 500 includes at least one storage tank 566 positioned to store water 212 and/or 232 such that water 212 and/or 232 may be channeled through channels 672 towards, for example, sink 228 and/or coffee machine 236 (i.e., external loads). In the exemplary embodiment, channels 560, 562, and 672 extend longitudinally along plate 670. In the exemplary embodiment, thermal energy storage module 668 is removably coupled to sink 228 and/or coffee machine 236.

During operation, fuel cell module 202 receives fuel 204 and oxidants 206, which are channeled through channels 560 and 562, respectively. In the exemplary embodiment, water 212 and/or 232 absorbs heat 214 from fuel cell module 202 as water 212 and/or 232 is channeled through third plurality of channels 672.

In the exemplary embodiment, water 212 and/or 232 is channeled across thermal energy storage module 668 such that heat 214 is transferred from thermal energy storage module 668 to water 212 and/or 232 such that a temperature of thermal energy storage module 668 is facilitated to be decreased and a temperature of water 212 and/or 232 is facilitated to be increased. That is, in the exemplary embodiment, water 212 and/or 232 cools thermal energy storage module 668 to enable thermal energy storage module 668 to absorb heat 214 from fuel cell module 202, and thermal energy storage module 668 heats water 212 and/or 232 for use in, for example, sink 228 and/or coffee machine 236 (i.e., external loads).

Figure 7:
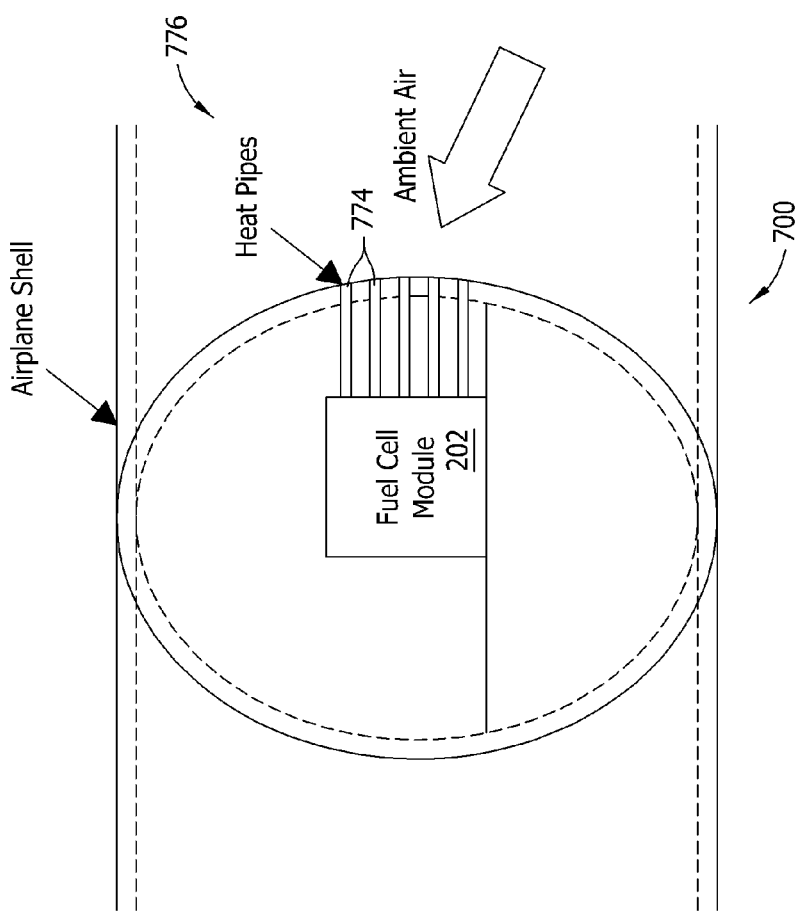

FIG. 7 is a schematic illustration of another exemplary heat transfer system 700 that may be used to utilize heat produced by a fuel cell module 202 on and/or within aircraft 100 (shown in FIG. 1). In the exemplary embodiment, fuel cell module 202 is coupled to a plurality of heat pipes 774 that extends towards an exterior 776 of aircraft 100. In the exemplary embodiment, heat pipes 774 are coupled to fuel cell module 202 to facilitate passively transferring heat 214 between fuel cell module 202 and exterior 776 such that heat 214 is discharged into the ambient environment. In the exemplary embodiment, heat pipes 774 are generally similar to heat pipes 220. Alternatively, heat pipes 774 may be fabricated from any other material and/or include any other fluid that enable heat transfer system 700 to function as described herein.

Figure 8:
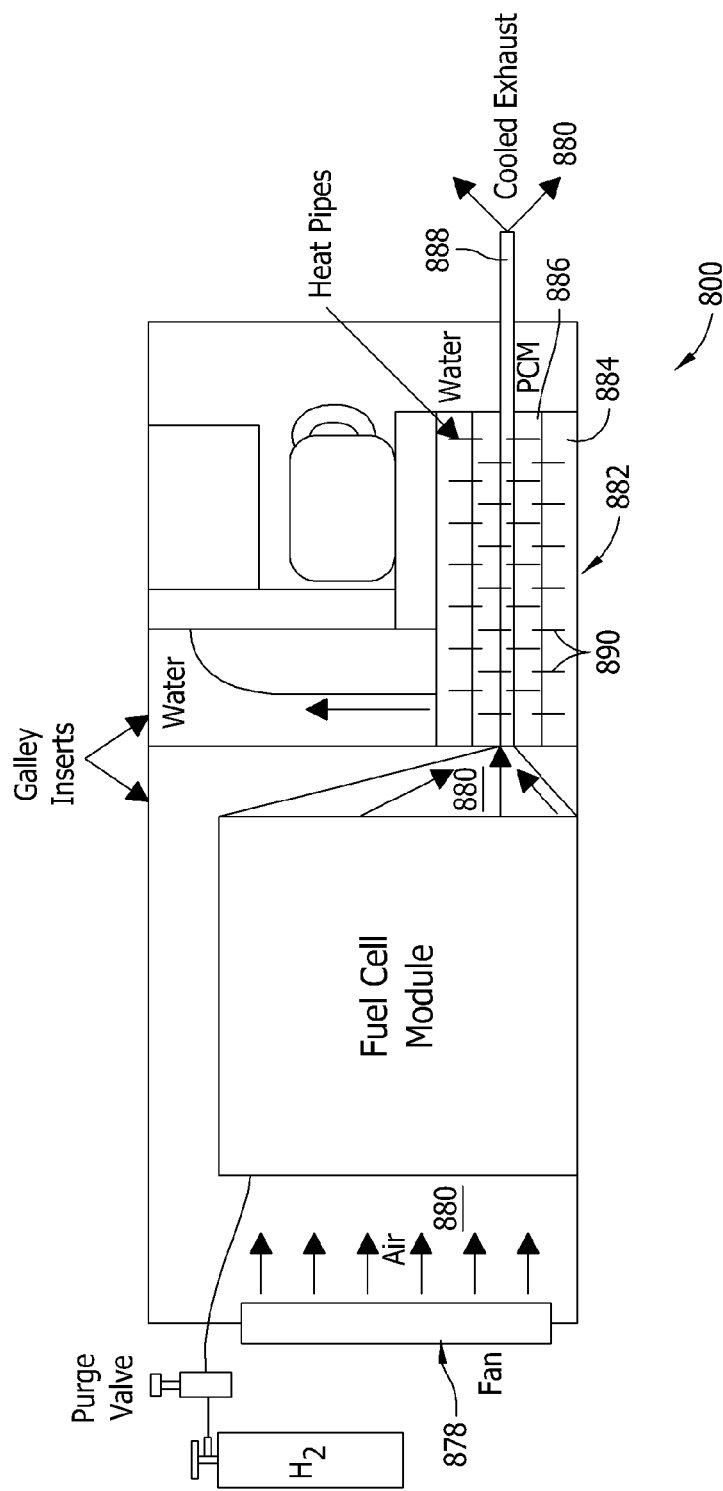
FIGS. 8-13 are schematic illustrations of exemplary heat transfer systems that utilize heat stored in a thermal energy storage module.

FIG. 8 is a schematic illustration of another heat transfer system 800 that may be used to utilize heat produced by fuel cell module 202 on and/or within aircraft 100 (shown in FIG. 1). In the exemplary embodiment, fuel cell module 202 is a semi-passive fuel cell that is operable using oxygen from a cabin of aircraft 100. More specifically, in the exemplary embodiment, a fan 878 is oriented to discharge air 880 across fuel cell module 202 and towards a heat exchanger 882 including a first tube 884 configured to channel water 212 and/or 232, a second tube 886 including PCM 222, and a third tube 888 configured to channel air 880. As such, in the exemplary embodiment, heat exchanger 882 facilitates removing heat 214 from air 880 and, thus, regulating a temperature within the cabin. In the exemplary embodiment, heat exchanger 882 is portable such that heat exchanger 882 is removable and dischargeable on the ground.

In the exemplary embodiment, tubes 884, 886, and 888 are substantially coaxial such that first tube 884 substantially circumscribes second tube 886, and second tube 886 substantially circumscribes third tube 888. In the exemplary embodiment, a plurality of heat pipes 890 couple second tube 886 to first tube 884 and/or third tube 888 to facilitate passively transferring heat 214 between second tube 886 and first tube 884 and/or third tube 888. In one embodiment, second tube 886 has a "cascade" configuration such that multiple PCMs 222 are utilized to absorb energy at specific melting points. Alternatively, tubes 884, 886, and 888 may have any orientation and/or configuration that enables heat transfer system 800 to function as described herein.

During operation, air 880 is channeled through fuel cell module 202 and third tube 888 such that heat 214 is transferred from fuel cell module 202 to PCM 222. That is, in the exemplary embodiment, air 880 cools fuel cell module 202. In the exemplary embodiment, PCM 222 stores heat 214 and transfers heat 214 towards water 212 and/or 232 to facilitate increasing a temperature of (i.e., heating) water 212 and/or 232. That is, in the exemplary embodiment, PCM 222 heats water 212 and/or 232 for use in, for example, coffee machine 236 (i.e., an external load).

Figure 9:
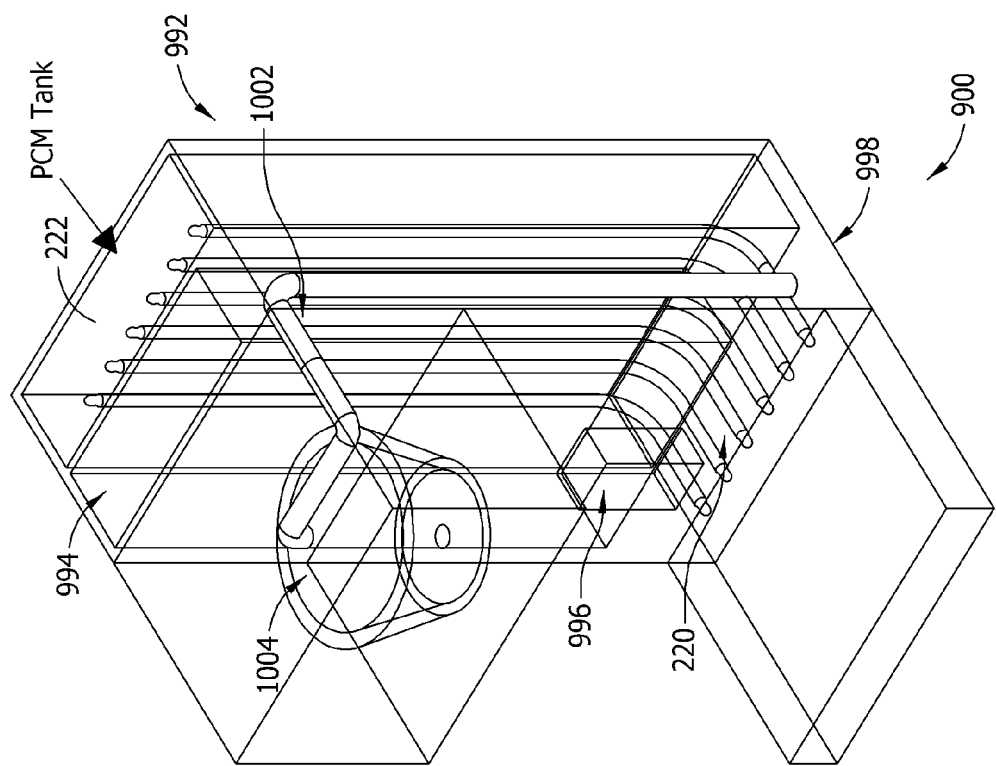

FIG. 9 is a schematic illustration of another heat transfer system 900 that may be used to utilize heat stored in a thermal energy storage module 992 on and/or within aircraft 100 (shown in FIG. 1). For example, in the exemplary embodiment, heat transfer system 900 may be used for a coffee machine and/or a water heating device. In the exemplary embodiment, heat transfer system 900 includes a storage tank 994 positioned to store water 232. In the exemplary embodiment, storage tank 994 includes a one-way valve 996 that is oriented to discharge water 232 through a first conduit 998. In the exemplary embodiment, a second conduit 1002 is coupled in flow communication with first conduit 998 and is oriented to discharge water 232 towards a vessel 1004.

In the exemplary embodiment, thermal energy storage module 992 includes heat pipes 220 and PCM 222. In the exemplary embodiment, heat pipes 220 are adjacent to and/or extend within first conduit 998. In one embodiment, thermal energy storage module 992 is removably coupled to storage tank 994. Additionally or alternatively, heat transfer system may include heating elements that are coupled to PCM 222. In one embodiment, at least one insulating layer substantially circumscribes thermal energy storage module 992 to facilitate decreasing heat loss to the ambient environment. In one embodiment, thermal energy storage module 992 is easily movable and weighs less than approximately 15 kilograms (kg). More particularly, thermal energy storage module 992 may weigh less than approximately 10 kg. Even more particularly, thermal energy storage module 992 may weigh less than approximately 5 kg. Alternatively, thermal energy storage module 992 may be of any weight that enables heat transfer system 900 to function as described herein.

During operation, heat 214 is stored within PCM 222, and thermal energy storage module 992 is coupled to storage tank 994. In the exemplary embodiment, water 232 is discharged from valve 996 and channeled through first conduit 998. In the exemplary embodiment, heat pipes 220 transfer heat 214 from PCM 222 towards water 232 channeled through first conduit 998 as water 232 is channeled through first conduit 998 to facilitate increasing a temperature of (i.e., heating) water 232. In the exemplary embodiment, heated water 232 is channeled through second conduit 1002 and is discharged towards vessel 1004. In one embodiment, water 232 is heated to be at least approximately 91° C. when discharged from second conduit 1002. More particularly, water 232 may be heated to be at least approximately 95° C. Alternatively, water 232 may be discharged at any temperature that enables coffee and/or tea to brew and/or water to boil.

Figure 10:
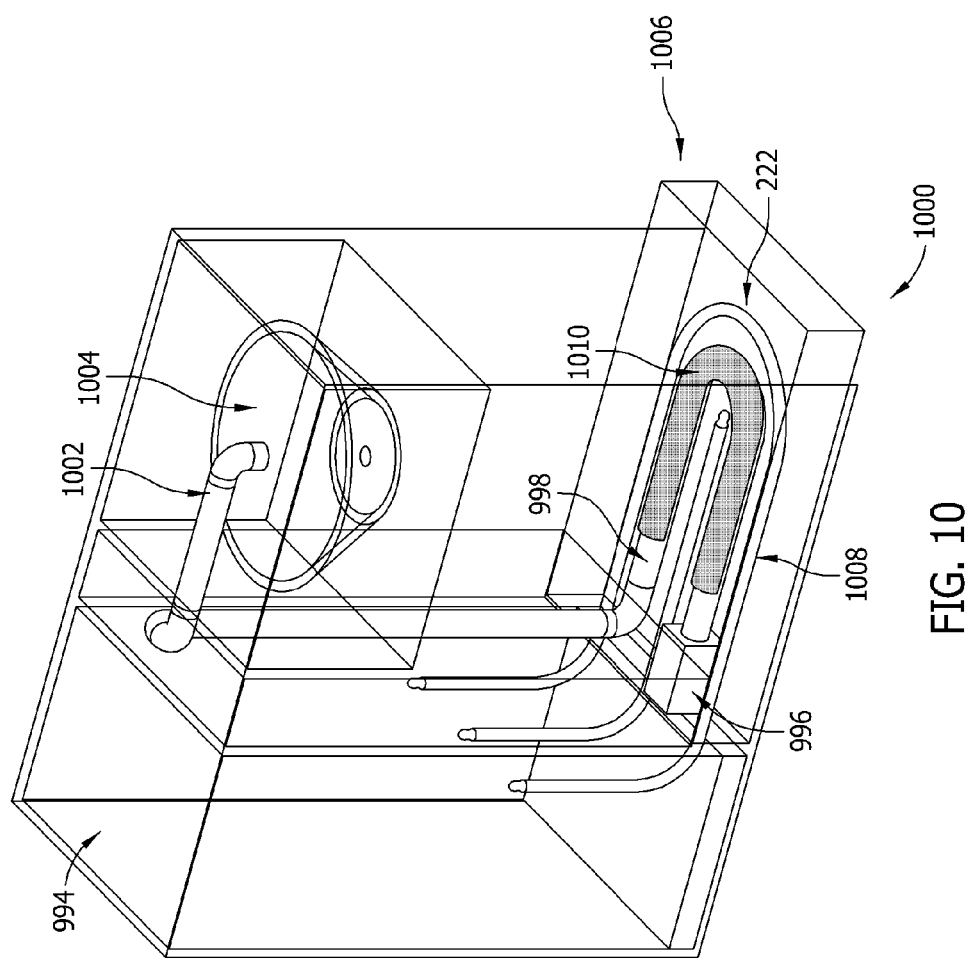

FIG. 10 is a schematic illustration of another heat transfer system 1000 that may be used to utilize heat stored in a thermal energy storage module 1006 on and/or within aircraft 100 (shown in FIG. 1). For example, in the exemplary embodiment, heat transfer system 1000 may be used for a coffee machine and/or a water heating device. In the exemplary embodiment, heat transfer system 1000 includes storage tank 994 positioned to store water 232. In the exemplary embodiment, storage tank 994 includes one-way valve 996 that is oriented to discharge water 232 through first conduit 998. In the exemplary embodiment, second conduit 1002 is coupled in flow communication with first conduit 998 and is oriented to discharge water 232 towards vessel 898.

In the exemplary embodiment, thermal energy storage module 1006 includes heat pipes 1008, PCM 222, and a heating element 1010. In the exemplary embodiment, heating element 1010 is coupled to first conduit 998 and substantially circumscribes first conduit 998. In the exemplary embodiment, PCM 222 substantially circumscribes heating element 1010 to facilitate decreasing heat loss to the ambient environment. In the exemplary embodiment, heat pipes 1008 extend through PCM 222 and into storage tank 994. In the exemplary embodiment, heat pipes 554 are generally similar to heat pipes 220. Alternatively, heat pipes 554 may be fabricated from any other material and/or include any other fluid that enable heat transfer system 500 to function as described herein. In one embodiment, thermal energy storage module 1006 is removably coupled to storage tank 994. In one embodiment, at least one insulating layer substantially circumscribes thermal energy storage module 1006 to facilitate decreasing heat loss to the ambient environment. In one embodiment, thermal energy storage module 1006 is easily movable and weighs less than approximately 15 kg. More particularly, thermal energy storage module 1006 may weigh less than approximately 10 kg. Even more particularly, thermal energy storage module 1006 may weigh less than approximately 5 kg. Alternatively, thermal energy storage module 1006 may be of any weight that enables heat transfer system 1000 to function as described herein.

During operation, water 232 is discharged from valve 996 and channeled through first conduit 998. In the exemplary embodiment, heat 214 is transferred from heating element 1010 towards water 232 channeled through first conduit 998 to facilitate increasing a temperature of (i.e., heating) water 232. In the exemplary embodiment, heated water 232 is channeled through second conduit 1002 and is discharged towards vessel 1004. Additionally, in the exemplary embodiment, heat 214 generated by heating element 1010 may be stored within PCM 222. In the exemplary embodiment, heat pipes 1008 transfer heat 214 stored within PCM 222 towards water 232 stored within storage tank 994 to facilitate capturing heat loss from heating element 1010 to the ambient environment and/or recycling the captured heat by moving it via heat pipes 1008 to the water.

Figure 11:
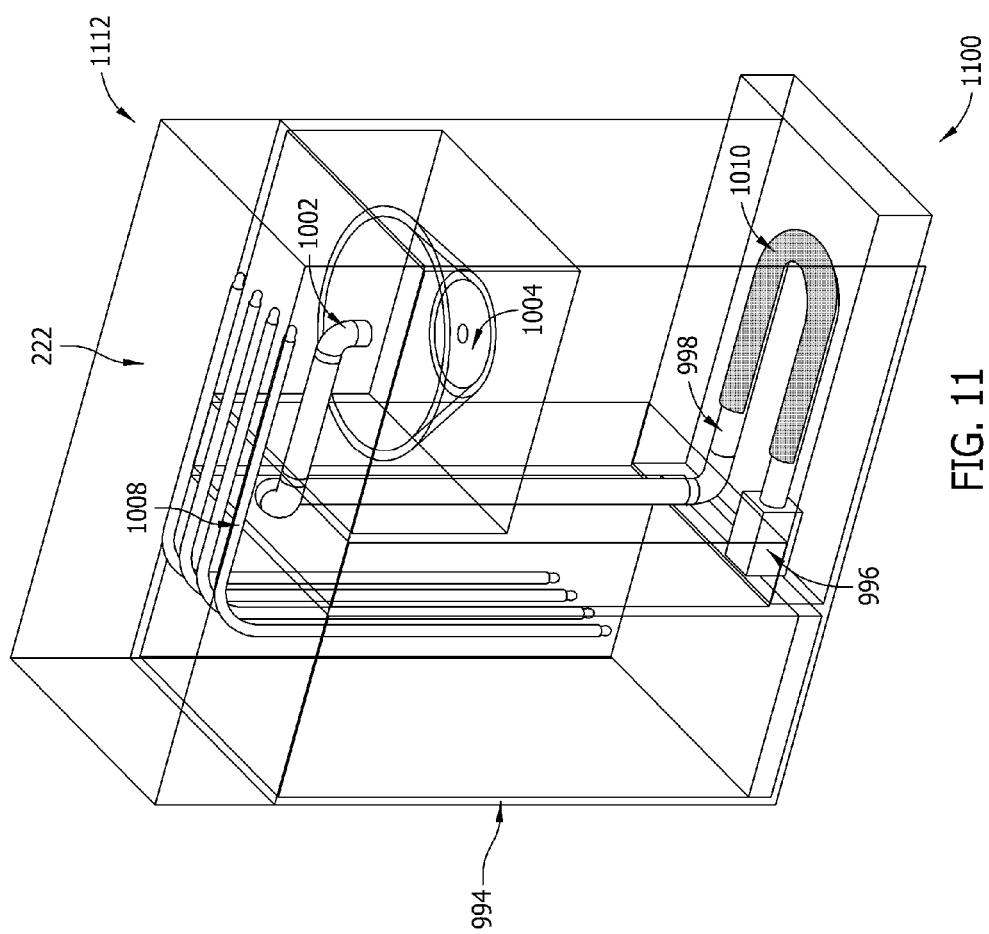

FIG. 11 is a schematic illustration of another heat transfer system 1100 that may be used to utilize heat stored in a thermal energy storage module 1112 on and/or within aircraft 100 (shown in FIG. 1). For example, in the exemplary embodiment, heat transfer system 1100 may be used for a coffee machine and/or a water heating device. In the exemplary embodiment, heat transfer system 1100 includes storage tank 994 positioned to store water 232. In the exemplary embodiment, storage tank 994 includes one-way valve 996 that is oriented to discharge water 232 through first conduit 998. In the exemplary embodiment, heating element 1010 is coupled to first conduit 998 and substantially circumscribes first conduit 998. In the exemplary embodiment, second conduit 1002 is coupled in flow communication with first conduit 998 and is oriented to discharge water 232 towards vessel 1004.

In the exemplary embodiment, thermal energy storage module 1112 includes heat pipes 1008 and PCM 222. In the exemplary embodiment, heat pipes 220 extend between PCM 222 and storage tank 994. In one embodiment, thermal energy storage module 1112 is removably coupled to storage tank 994 such that thermal energy storage module 1112 is chargeable (i.e., heated) remote from storage tank 994. In one embodiment, at least one insulating layer substantially circumscribes thermal energy storage module 1112 to facilitate decreasing heat loss to the ambient environment. In one embodiment, thermal energy storage module 1112 is easily movable and weighs less than approximately 15 kg. More particularly, thermal energy storage module 1112 may weigh less than approximately 10 kg. Even more particularly, thermal energy storage module 1112 may weigh less than approximately 5 kg. Alternatively, thermal energy storage module 1112 may be of any weight that enables heat transfer system 1100 to function as described herein.

During operation, heat 214 is stored within PCM 222, and thermal energy storage module 1112 is coupled to storage tank 994. In the exemplary embodiment, heat pipes 1008 transfer heat 214 stored within PCM 222 towards water 232 stored within storage tank 994 to facilitate increasing a temperature of (i.e., heating) water 232. In the exemplary embodiment, water 232 discharged from valve 996 and channeled through first conduit 998. In the exemplary embodiment, heat 214 generated by heating element 1010 is absorbed by water 232 channeled through first conduit 998 to facilitate increasing a temperature of (i.e., heating) water 232 and/or reducing an electrical demand on heating element 1010. In the exemplary embodiment, heated water 232 is channeled through second conduit 1002 and is discharged towards vessel 1004.

Figure 12:
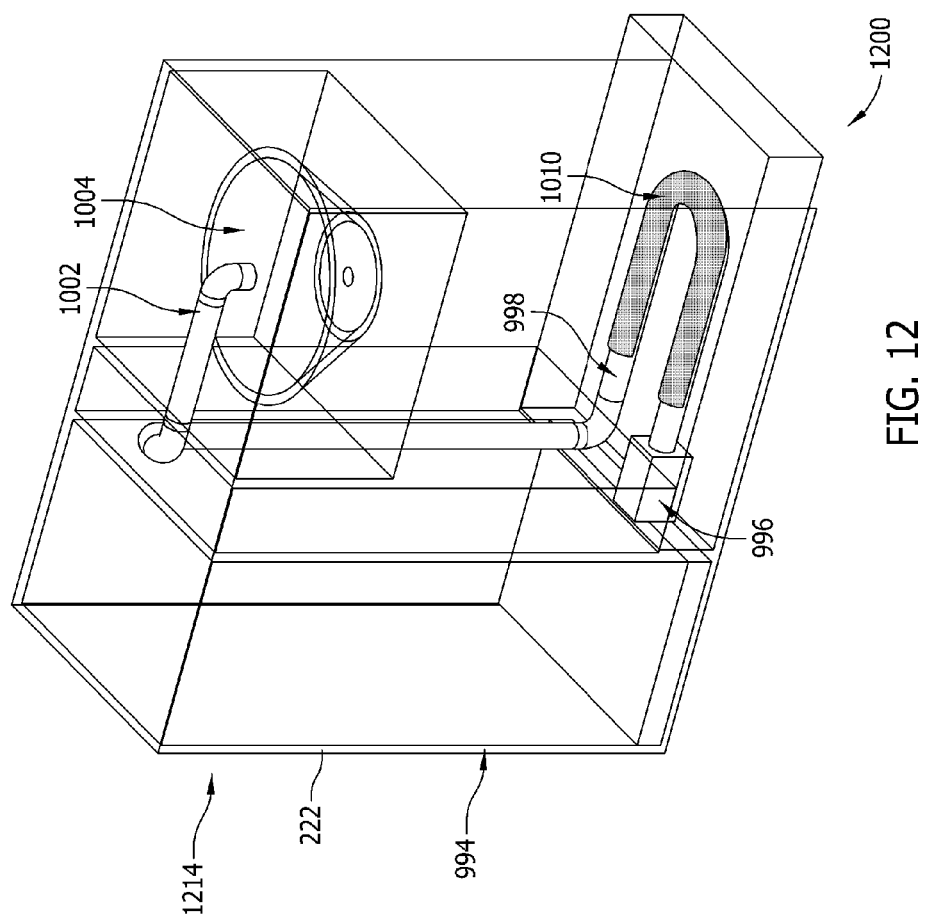

FIG. 12 is a schematic illustration of another heat transfer system 1200 that may be used to utilize heat stored in a thermal energy storage module 1214 on and/or within aircraft 100 (shown in FIG. 1). For example, in the exemplary embodiment, heat transfer system 1200 may be used for a coffee machine and/or a water heating device. In the exemplary embodiment, heat transfer system 1200 includes storage tank 994 positioned to store water 232. In the exemplary embodiment, storage tank 994 includes one-way valve 996 that is oriented to discharge water 232 through first conduit 998. In the exemplary embodiment, heating element 1010 is coupled to first conduit 998 and substantially circumscribes first conduit 998. In the exemplary embodiment, second conduit 1002 is coupled in flow communication with first conduit 998 and is oriented to discharge water 232 towards vessel 1004.

In the exemplary embodiment, thermal energy storage module 1214 includes PCM 222 that substantially circumscribes storage tank 994. In one embodiment, thermal energy storage module 1214 is removably coupled to storage tank 994 such that thermal energy storage module 1214 is chargeable (i.e., heated) remote from storage tank 994. In one embodiment, at least one insulating layer substantially circumscribes thermal energy storage module 1214 to facilitate decreasing heat loss to the ambient environment. In one embodiment, thermal energy storage module 1214 is easily movable and weighs less than approximately 15 kg. More particularly, thermal energy storage module 1214 may weigh less than approximately 10 kg. Even more particularly, thermal energy storage module 1214 may weigh less than approximately 5 kg. Alternatively, thermal energy storage module 1214 may be of any weight that enables heat transfer system 1200 to function as described herein.

During operation, heat 214 is stored within PCM 222, and thermal energy storage module 1214 is coupled to storage tank 994. In the exemplary embodiment, heat 214 stored within PCM 222 is transferred towards water 232 stored within storage tank 994 to facilitate increasing a temperature of (i.e., heating) water 232. In the exemplary embodiment, water 232 discharged from valve 996 and channeled through first conduit 998. In the exemplary embodiment, heat 214 generated by heating element 1010 is absorbed by water 232 channeled through first conduit 998 to facilitate increasing a temperature of (i.e., heating) water 232. In the exemplary embodiment, heated water 232 is channeled through second conduit 1002 and is discharged towards vessel 1004.

Figure 13:
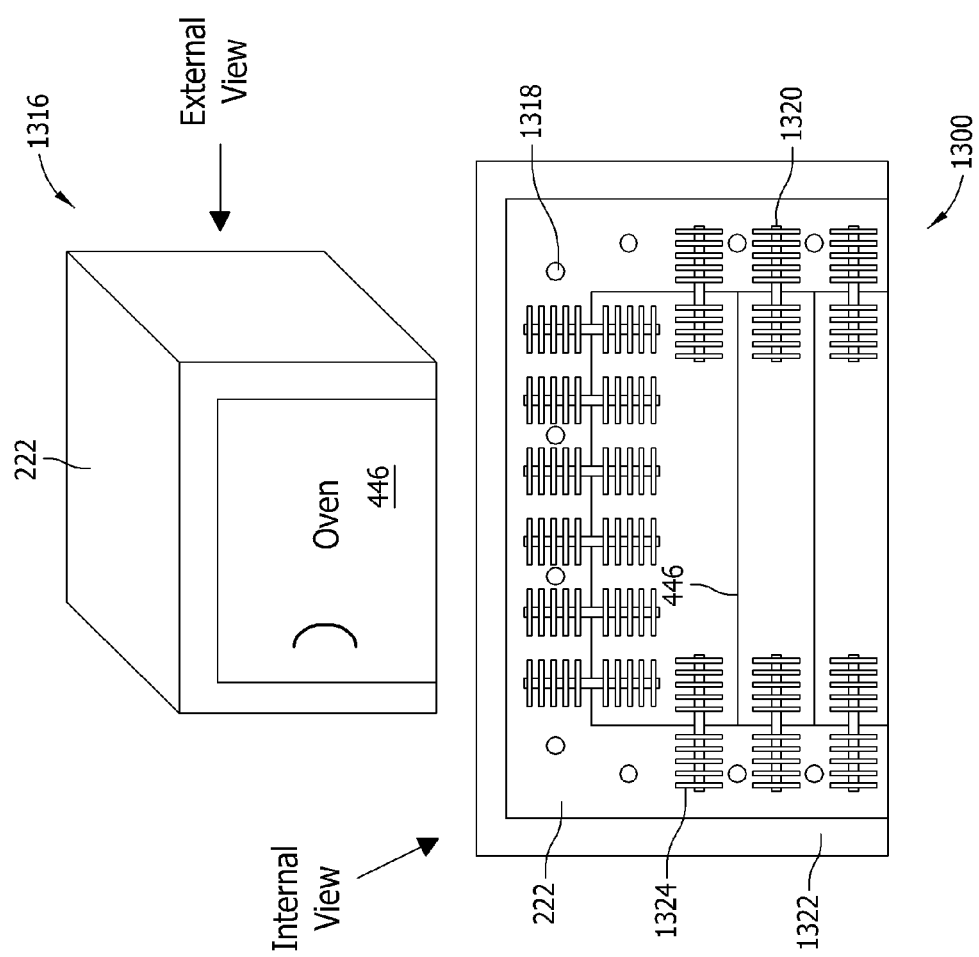

FIG. 13 is a schematic illustration of another heat transfer system 1300 that may be used to utilize heat stored in a thermal energy storage module 1316 on and/or within aircraft 100 (shown in FIG. 1). In the exemplary embodiment, heat transfer system 1300 includes, for example, oven 446 (i.e., an external load). In the exemplary embodiment, thermal energy storage module 1316 includes PCM 222, heating elements 1318, and a plurality of heat pipes 1320 extending between PCM 222 and oven 446. In the exemplary embodiment, PCM 222 substantially circumscribes oven 446 to facilitate decreasing heat loss to the ambient environment. Moreover, in the exemplary embodiment, at least one insulating layer 1322 substantially circumscribes thermal energy storage module 1316 to facilitate decreasing heat loss to the ambient environment. In one embodiment, thermal energy storage module 1316 is removably coupled to oven 446. In one embodiment, thermal energy storage module 1316 is easily movable and weighs less than approximately 15 kg. More particularly, thermal energy storage module 1316 may weigh less than approximately 10 kg. Even more particularly, thermal energy storage module 1316 may weigh less than approximately 5 kg. Alternatively, thermal energy storage module 1316 may be of any weight that enables heat transfer system 1300 to function as described herein.

In the exemplary embodiment, heating elements 1318 and/or heat pipes 1320 are arranged in a spaced configuration within PCM 222 to facilitate increasing heat transfer between PCM 222 and oven 446. In the exemplary embodiment, heat pipes 1320 includes a plurality of fins 1324 that facilitate increasing a surface area of heat pipes 1320 such that heat transfer between PCM 222 and oven 446 is increased. Alternatively, heating elements 1318 and/or heat pipes 1320 may be arranged in any configuration that enables heat transfer system 1300 to function as described herein.

During operation, heat 214 is generated by heating elements 1318 and/or stored within PCM 222. For example, in one embodiment, the stored heat may be generated when aircraft 100 is grounded. In the exemplary embodiment, heat pipes 1320 transfers heat 214 towards oven 446 to facilitate increasing a temperature of (i.e., heating) oven 446.

The embodiments described herein relate generally to heat transfer systems and, more particularly, to methods and systems for utilizing heat produced by a fuel cell module and/or utilizing heat stored in a thermal energy storage module. The embodiments described herein facilitate increasing fuel cell efficiency for use in an airplane galley and/or decreasing a quantity of airplane generated power required to operate the airplane during flight. As such, the embodiments described herein facilitate decreasing an amount of power used by galleys through energy storage, use of combined heat and power from fuel cells, and efficient transfer of the heat from the fuel cell to galley insert loads.

Exemplary embodiments of methods and systems for transferring, storing, and/or utilizing heat in an aircraft environment are described above in detail. The methods and systems are not limited to the specific embodiments described herein, but rather, components of systems and/or steps of the method may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of operating a heat transfer system for use in an aircraft galley, said method comprising:
    coupling a plurality of heat pipes to a load in the aircraft galley, and to a fuel cell module configured to produce heat, wherein the load is a device or a machine;
    transferring the heat to a thermal energy storage module from the fuel cell module, the thermal energy storage module including a phase-change material capable of storing the heat, wherein the heat is stored in the thermal energy storage module;
    coupling the thermal energy storage module to the plurality of heat pipes to facilitate transferring the heat towards the load.

2. A method in accordance with claim 1 further comprising providing electricity to a plurality of heating elements oriented to transfer heat towards the phase-change material.

3. A method in accordance with claim 1, wherein coupling the thermal energy storage module further comprises removably coupling the thermal energy storage module to at least one of the load and the plurality of heat pipes.

4. An aircraft comprising:
    a galley comprising at least one load positioned therein;
    a fuel cell module configured to produce heat and water; and
    a heat transfer system comprising:
        a first plurality of heat pipes coupled to said at least one load; and
        a thermal energy storage module coupled to said first plurality of heat pipes to facilitate transferring the heat produced by said fuel cell module towards said at least one load, said thermal energy storage module comprising a phase-change material capable of storing the heat.

5. The aircraft in accordance with claim 4, wherein said heat transfer system further comprises a second plurality of heat pipes are coupled between said fuel cell module and said thermal energy storage module such that heat produced by said fuel cell module is stored within the phase-change material.

6. The aircraft in accordance with claim 5 further comprising a water storage tank, wherein said thermal energy storage module is coupled to said water storage tank such that the heat stored within the phase-change material is transferred towards water stored in said water storage tank.

7. The aircraft in accordance with claim 4, wherein said heat transfer system further comprises a conduit that couples said fuel cell module to said thermal energy storage module, said conduit configured to channel the water produced by said fuel cell module through said thermal energy storage module, thereby forming a stream of heated water, said conduit further extending from said thermal energy storage module for channeling the stream of heated water towards said at least one load.

8. The aircraft in accordance with claim 7, wherein said at least one load configured to receive the stream of heated water comprises at least one of a sink or a coffee machine.

9. The aircraft in accordance with claim 4, wherein said first plurality of heat pipes are coupled to said at least one load such that the heat produced by said fuel cell module is transferred towards said at least one load.

10. The aircraft in accordance with claim 4 further comprising an insulating layer substantially circumscribing said thermal energy storage module.

* * * * *